F. O. WOODLAND.
LABELING MACHINE.
APPLICATION FILED SEPT. 18, 1912.

1,113,854.

Patented Oct. 13, 1914.
5 SHEETS—SHEET 2.

F. O. WOODLAND.
LABELING MACHINE.
APPLICATION FILED SEPT. 18, 1912.

1,113,854.

Patented Oct. 13, 1914.
5 SHEETS—SHEET 3.

Witnesses.
Ella P. Blenus
Walter H. Adams

Inventor
Frank O. Woodland,
By Thos. H. Burleigh
Attorney

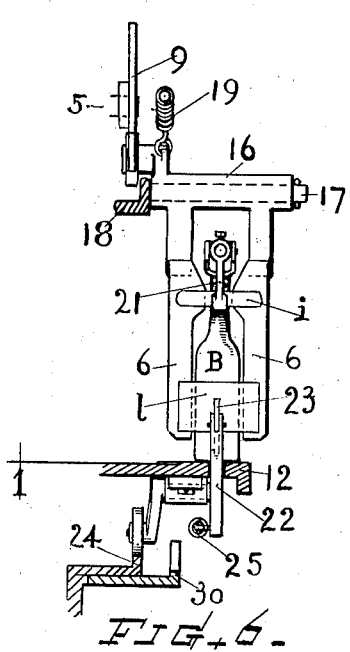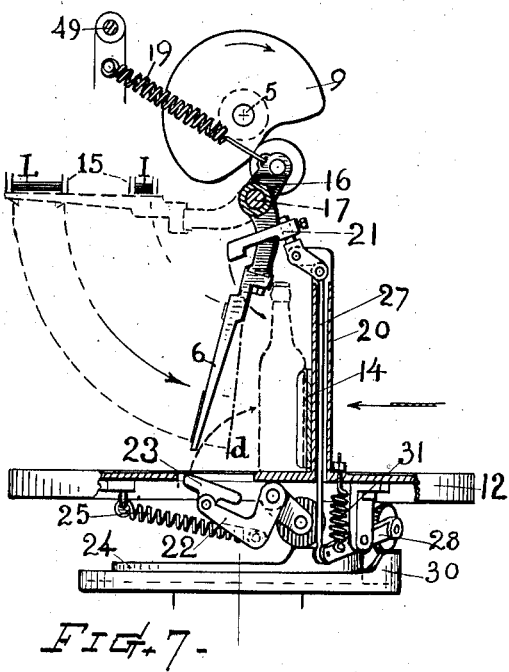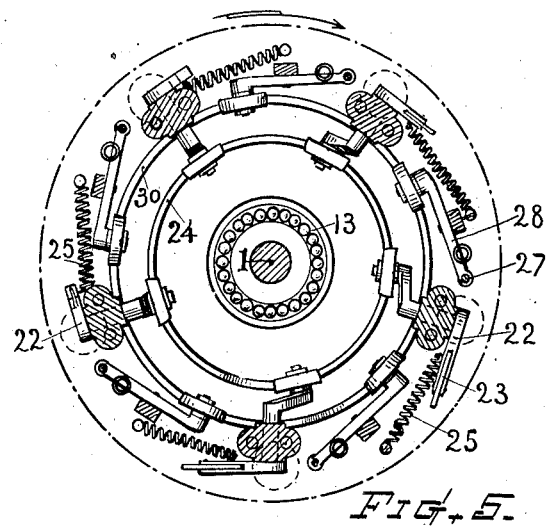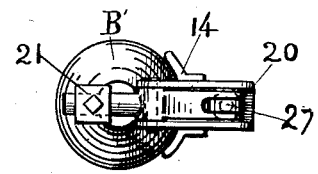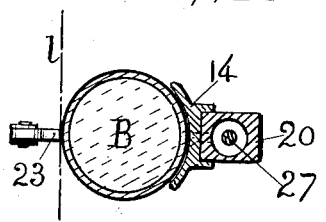

F. O. WOODLAND.
LABELING MACHINE.
APPLICATION FILED SEPT. 18, 1912.
1,113,854.
Patented Oct. 13, 1914.
5 SHEETS—SHEET 5.
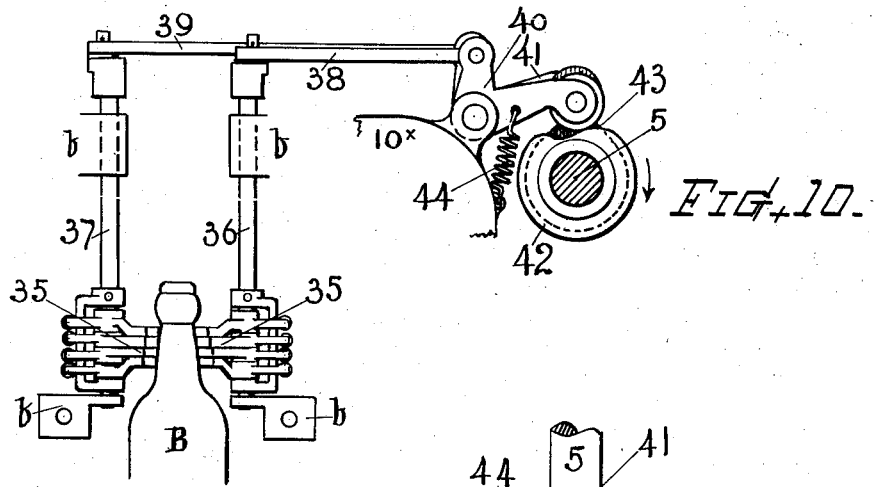
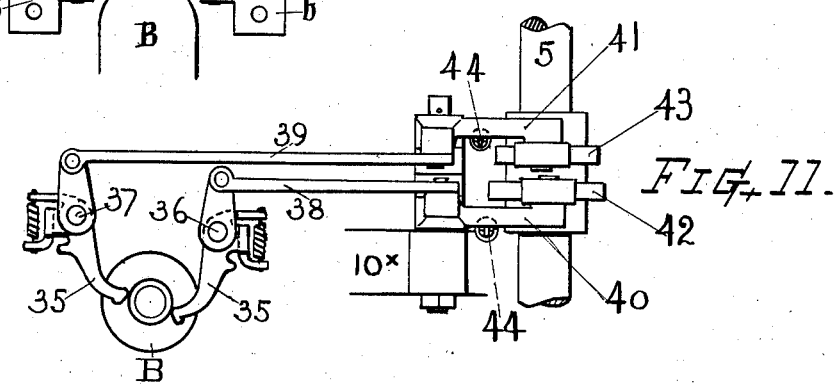
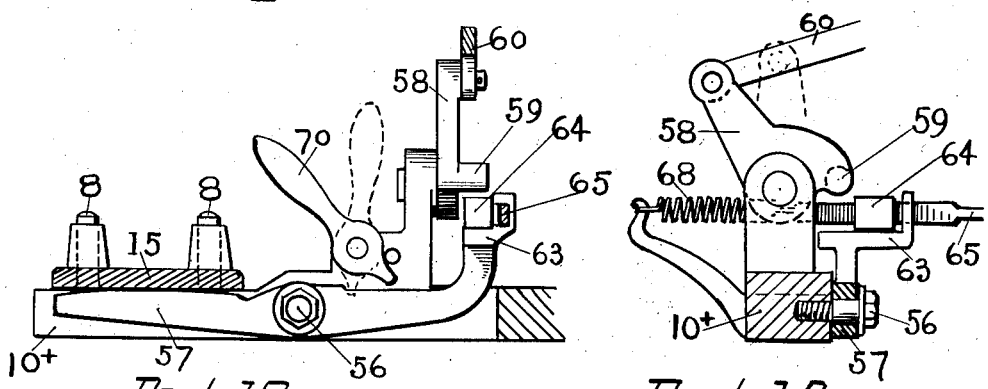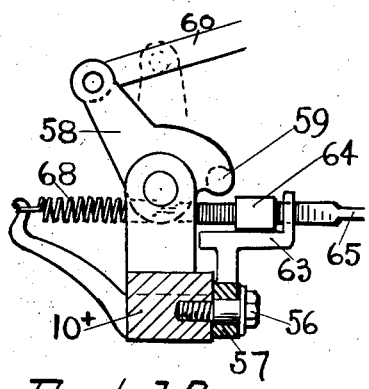
Witnesses.
Ella P. Blenus
Walter H. Adams
Inventor.
Frank O. Woodland,
By Chas. H. Burleigh
Attorney.

UNITED STATES PATENT OFFICE.

FRANK O. WOODLAND, OF WORCESTER, MASSACHUSETTS, ASSIGNOR TO ECONOMIC MACHINERY COMPANY, OF WORCESTER, MASSACHUSETTS, A CORPORATION OF WEST VIRGINIA.

LABELING-MACHINE.

1,113,854.   Specification of Letters Patent.   Patented Oct. 13, 1914.

Application filed September 18, 1912. Serial No. 720,913.

*To all whom it may concern:*

Be it known that I, FRANK O. WOODLAND, a citizen of the United States, residing at Worcester, in the county of Worcester and State of Massachusetts, have invented a new and useful Labeling-Machine, of which the following is a specification, reference being made therein to the accompanying drawings.
The object of my present invention is to provide an efficient and convenient labeling machine of the class wherein the bottles, or other similar articles to be labeled, are carried upon a moving table or carrier that preferably rotates about an upright axis; said carrier being combined with means for gumming, presenting and affixing the label, or labels, in a novel and peculiar organization; and for working in a successive continuous manner, as a series of bottles, or articles, are severally presented for receiving their labels; the various mechanisms being organized for operation as more fully described.
The particular subject matter claimed is definitely set forth in the summary.

Figure 1:
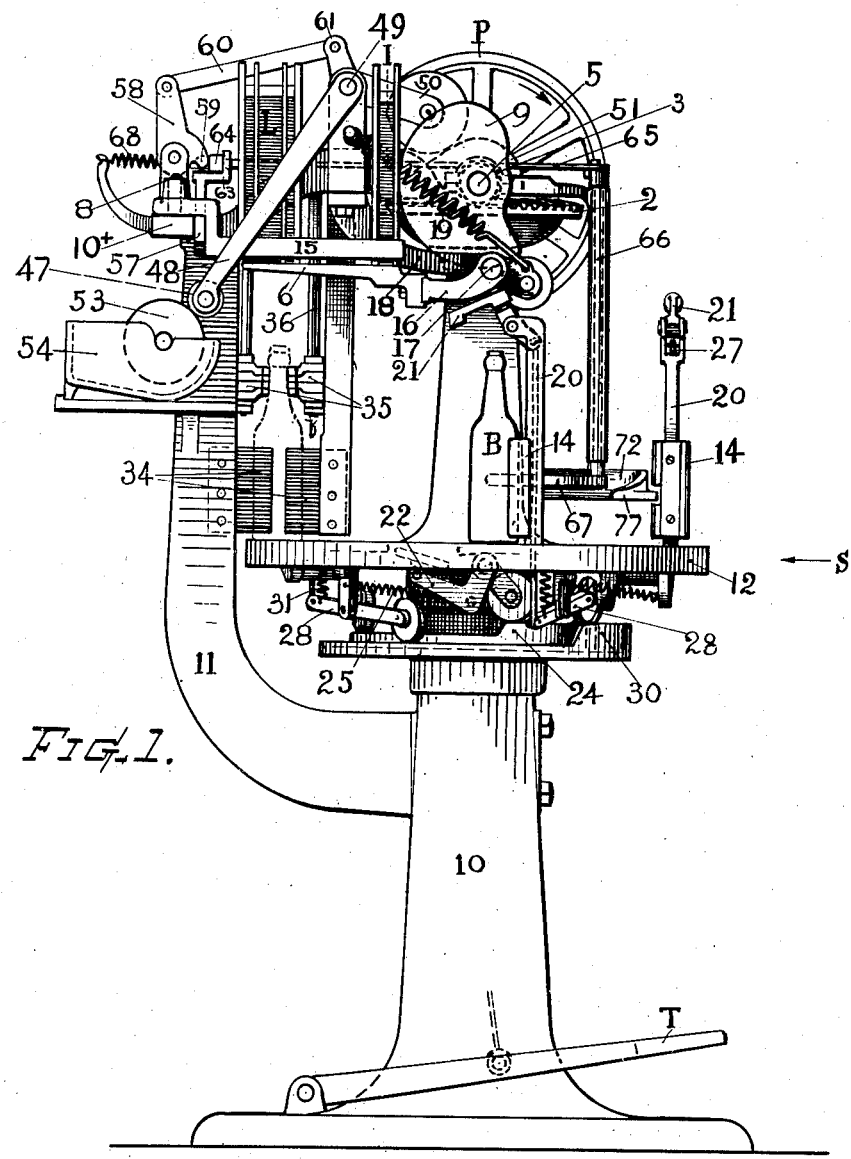
Figure 2:
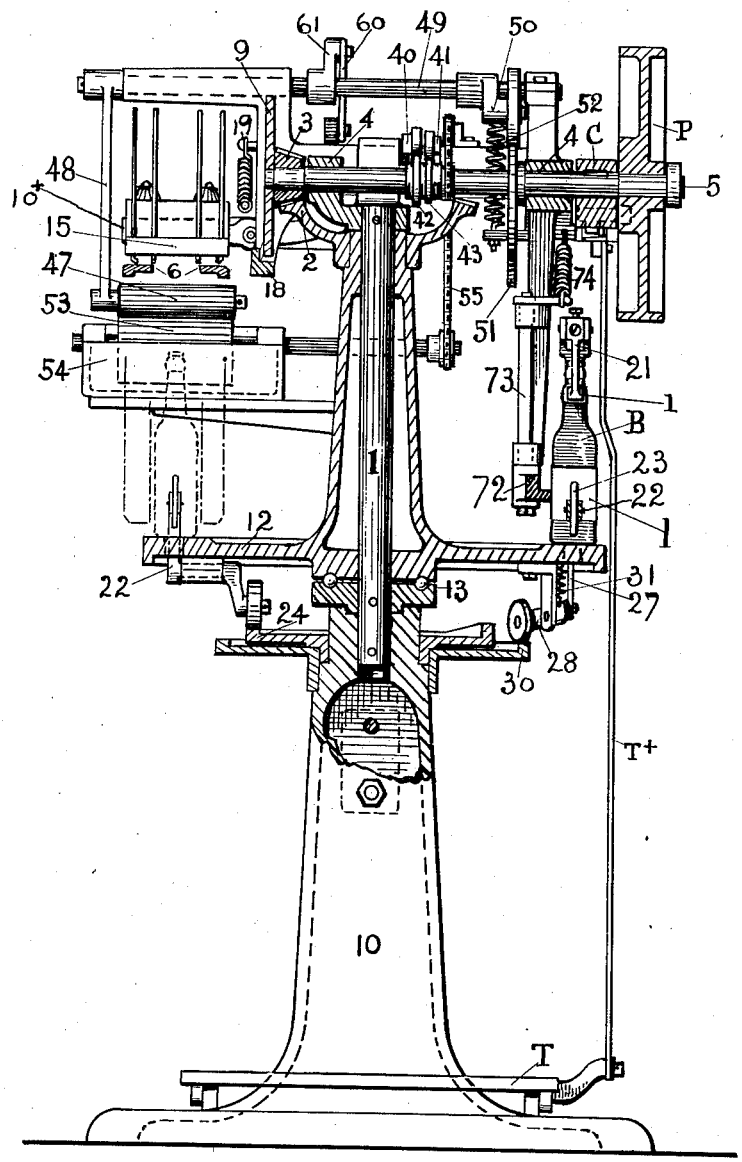
Figure 3:
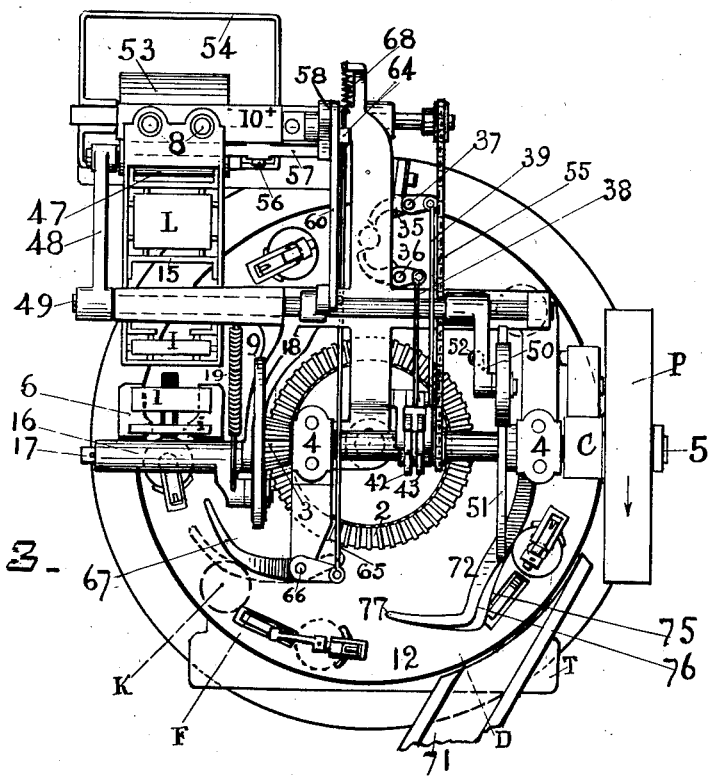
Figure 4:
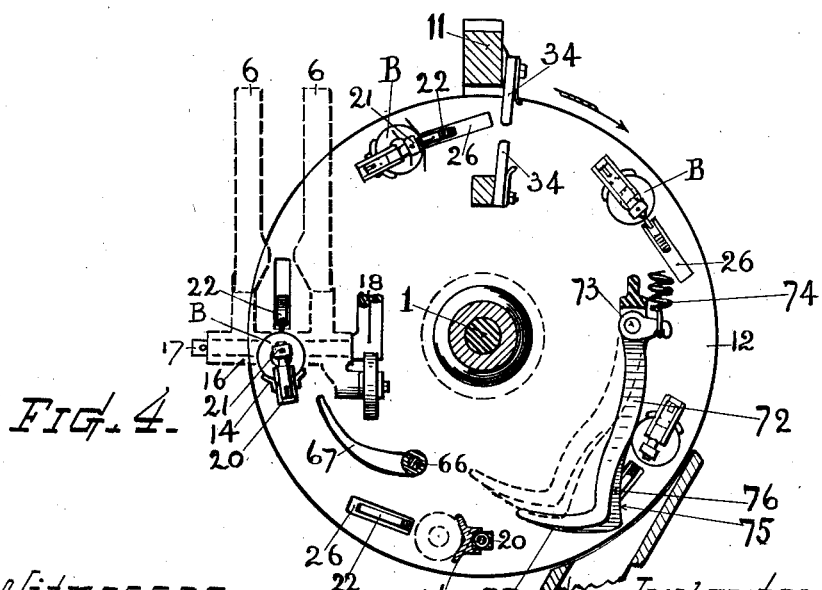

In the drawings, Figure 1 represents a side elevation view of a labeling machine embodying my invention; the position of the mechanism being approximately as assumed just as the pickers are about to move away from the label-pack for delivering the label to the advancing bottle. Fig. 2 is a vertical sectional elevation of the machine, looking in the direction indicated by the arrow S on Fig. 1. Fig. 3 represents a top plan view; Fig. 4 a horizontal sectional plan view below the gear and operating shaft; the alinement location of the pickers being indicated thereon by dotted lines. Fig. 5 is a horizontal sectional plan below the rotating table or bottle carrier. Fig. 6 is a fragmentary detail view showing the front of the pickers and grip-devices. Fig. 7 is a detail view showing the side of the pickers and grip-devices just before the delivery of the labels, and illustrating the action thereof. Fig. 8 is a separate top view of the neck label grip-device. Fig. 9 represents a horizontal section through one of the bottle supporters. Fig. 10 is an elevation view of neck-label wipers and means for operating the wipers for closing in as the neck of the bottle passes. Fig. 11 is a plan view of the parts shown in elevation by Fig. 10. Fig. 12 represents a front view of a means for automatically controlling the feed of labels to the pickers, and Fig. 13 represents a transverse vertical section of the same.

In this application the term "glue" is intended to include, as equivalents, any variety or kind of adhesive substance heretofore employed, and suitable for use in labeling machines.

Referring to the drawings, the numeral 10 indicates the main supporting frame, preferably consisting of an upright pedestal or column with a broad circular base for standing upon the floor. Fixed in the upper end of said column is a vertical pintle or shaft 1 upon which is supported a rotating table or carrier 12 that runs upon an annular bearing seat which can, if desired, be provided with a ball-bearing race 13 and system of bearing-balls for reducing the frictional resistance to a minimum. An upwardly projecting central member of the carrier 12 is provided with a beveled gear-wheel 2 fixed thereon, which is engaged by a beveled pinion 3 keyed upon the main operating shaft 5 that is horizontally journaled in bearings 4 upon the frame, and provided with a drive-pulley P; said pulley being best arranged to run loose upon the shaft and to be coupled thereto for operation by an automatic-stop clutch C of suitable kind; which when thrown into engagement causes the shaft to turn one complete revolution, and then to automatically release, as is customary in certain classes of machinery; or if the clutch-operating treadle is held depressed the continued rotation of the shaft and an uninterrupted operation of mechanism results.

The portion of the main gear 2 within the circle of its toothed face is of dishing form, (see Fig. 2) thus permitting the arm of the frame to curl under the shaft 5 and provide a bearing or support for the top end of the upright pintle shaft 1, and also to support the bearing 4 of the operating shaft 5 above the gear. It also affords space for cams hereinafter described.

The carrier is provided, at convenient stations or intervals upon its upper face, with means 14 for supporting, in approximately upright position, the bottles or like articles to be labeled; and is adapted for advancing said bottles or articles in a predetermined path for successively receiving their labels, and passing through the various stages in their affixment, as more fully hereinafter explained.

The upper portion of the frame is, in the present instance, rigidly attached to the main column by an arm 11 in the manner illustrated, and said upper frame is formed with suitable arms and bearing members for supporting the several parts of the working mechanism, as required.

15 indicates a top-charged bottom-delivery label-holder of suitable construction which is adapted for containing one or more packs of labels, as may be required. In the present illustration a pack of body-labels L and a pack of neck-labels I are shown. The general structure of this label-holding means is substantially such as heretofore employed. The label-holder is removably supported upon an arm 10˟ of the frame by vertical pins 8 or equivalent devices, so as to be readily lifted from position. Its central alinement corresponds with that of the pickers.

The picker mechanism preferably comprises a rocking carrier or hub 16 fulcrumed upon a horizontal axis-stud 17 approximately transverse to and above the path of the advancing bottles, said stud being fixed in or supported by an arm 18 on the frame. Said carrier has two arms to which glue-applying picker-plates 6 of suitable form are removably attached and adapted for applying the glue, gum, or adhesive substance to the labels in dual manner. In accordance with the preferred embodiment of my present invention as shown in the drawings the pickers 6 are arranged to swing downward from the bottom of the label-holder, taking labels adhesively therefrom, and presenting the same across the path in which the bottle, or article to be labeled, travels with the movement of the carrier 12; the pickers moving downward to meet the advancing bottle at a position where the pickers 6 are approximately coincident with the front of the bottle B; that is, at about the position indicated by the dot-and-dash line $d$ on Fig. 7, there delivering the labels against the surface of the bottle where it is clamped or gripped thereto by grip-devices, as hereinafter described. The pickers retreat or swing backward in the general direction of the bottle movement, but with a motion more rapid than the bottle-carrier movement, so that as the pickers retreat the labels are stripped from the picker faces by the differential action and carried forward with the bottle traveling in its circular or advancing path, while the pickers move up to the bottom of the label-holder, permitting the bottle to pass beneath them, and are recharged for the succeeding action. The pickers are detachably secured to the arms of the picker-carrier by screw-bolts, so that they can be readily changed for various forms of picker. The pickers are actuated by a suitably shaped cam 9, mounted upon the operating shaft 5, and acting against a roller pivoted to a short arm projecting from the picker-carrier hub 16, and by a suitable spring 19; the spring serving to swing the pickers down toward the bottle; while the cam serves to control the time of movement and to swing the pickers up to the label-holder.

The label-holder and pickers are arranged in such relation to the rotating carrier table that a central vertical plane taken through the label-holder and pickers is approximately tangential to the circular path in which the bottles are moved by the carrier.

The term tangential, as employed in the present specification and claims, is not used in its exact geometrical sense, but as expressing the idea that the general relation of the path of the pickers and the path of the bottles is such that the pickers, swinging or moving in a plane, carry the labels from the label-supply source, positioned outside of or beyond the limit of the circle, to a position at which the centers of the labels are approximately coincident with the center of the path in which the bottles move when at the place where the labels are successively applied to the moving bottles.

The series of bottle-supporters are arranged at suitable intervals upon the carrier table 12. In the present instance there are five of them, but a greater or less number may be employed in the series, if preferred. As herein shown each supporter consists of an approximately upright standard 20 with a rest or cradle member 14 attached thereto for keeping the bottle or article in proper position, and pressing it forward against the pickers and label, and through the wipers. The bottles B are placed upon the carrier at the front of the supporter 14 when the latter is at about the position of the line F, Fig. 3, and are delivered therefrom when they have been carried to about the position of the line D on the same figure. The feeding and discharge may be performed either by hand or by automatic mechanism.

21 and 22 indicate the label-gripping devices which are mounted to travel with the rotary bottle-carrier 12. In this instance I employ two independently actuated gripping members; that is, an upper and a lower grip-device for each of the bottle supporting stations; the lower grip-devices being for centrally retaining body-labels, and the upper grip-devices being for retaining neck-labels, the several grip-devices being independently actuated as they come to a predetermined position in the cycle of action. The lower grip device, as here shown, consists of a two-armed member or lever pivotally fulcrumed in connection with the carrier 12, and having one arm provided with the presser pad or face member 23 that contacts with the label, while the other arm is provided with a roll that follows the stationary actuating cam 24 for controlling the gripping action. The grip-face is adapted to swing down into a slot 26 (see Figs. 3 and 4) formed through the table or carrier 12, and a spring 25 is combined with the grip-lever for swinging up the arm and pressing the face of the grip-device against the label and bottle when the roller runs from the high part of its cam. This grip-device is brought into action as the pickers with the label approach the bottle, or article to be labeled. The upper grip-device is preferably arranged as best shown in Figs. 1, 7 and 8. It consists of a finger or lever pivoted to the offset end of the upright rear end is pivoted to a rod 27 that extends standard 20, above the top of the bottle. Its down, within or near the standard, to a position beneath the carrier-table 12, where it connects with means for its actuation. This actuating means, in the present instance, consists of a lever 28 fulcrumed upon a suitable bracket and provided with a roller that runs upon a stationary cam 30; a suitable spring 31 being combined therewith for moving the grip-device toward the bottle when the roll passes from the high part of the cam.

The grip-devices are arranged to be brought into action as the pickers carrying the labels approach the surface of the bottle, or article to be labeled; and the grip upon the labels is maintained until after the bottle has passed the wipers. The upper grip-device is preferably made in two parts, so that the arm or finger portion thereof can be removed and changed for a finger of different length, in case the neck label is desired to occupy a different position on the neck of the bottle. The grip-devices or fingers 21 and 22, being arranged so that the arc of their movement is in a plane approximately coinciding with the center of the path in which the bottle moves, they occupy but little lateral space and can readily pass between the pairs of wipers without interfering therewith as the carrier revolves.

Numerals 34 and 35 indicate the wipers for smoothing and affixing the labels upon the surface of the bottle, or like article. The wipers 34 for the body labels, are supported in upright relation in connection with the stationary frame, at either side of the path of the pickers; (see Figs. 1 and 4) and are so arranged that the traveling movement of the carrier 12 and supporting members 14 causes the bottle, or article having the freshly glued label centrally gripped thereto, to pass between the opposite wipers, whereby the glued ends of the label are smoothed out and firmly pressed against the respective sides of the bottle.

The neck-label wipers 35 are best located approximately above the body wipers, and may be of any suitable construction. In many instances it is desired to carry the ends of the neck-labels completely around the bottle neck; and for such purpose the neck wipers are made to have an inward tumbling action, causing the ends of the wiper fingers to move inward at the back of the neck. For effecting this action the wipers, which preferably consist of a gang of spring pressed fingers, (see Figs. 10 and 11) are severally mounted on shafts 36 and 37, journaled in suitable bearings $b$ upon the frame, and having each an arm or crank member that connects with actuating means whereby said shafts are operated to swing the wipers inward, or toward each other, as the swell of the bottle neck passes the ends of the wipers.

38 and 39 indicate connecting rods joining the crank members of the wiper-shafts with angle-levers 40 and 41 that are fulcrumed on the frame and worked by cams 42 and 43 upon the operating shaft 5 (see Figs. 3, 10 and 11) said cams being suitably shaped to impart the desired wiper movement. A suitable spring 44 is employed in connection with the respective wiper actuating means for causing the stud-rolls of its angle-levers 40 and 41 to follow the face of their actuating cams. One of the cams, 42, is shaped with a depression, and the other cam, 43, with a swell at the position of action; thus giving the required right and left action for the opposite wipers in the pair.

47 indicates the glue-distributing roller carried by a swinging arm 48 attached to a rocker-shaft 49 mounted in bearings upon the upper portion of the frame, and provided with an arm and roller 50 that runs against the face of a controlling cam 51 mounted upon the operating shaft 5, and with a spring 52. The swing of the arm 48 carries the glue-distributing roller from the glue supply-roll 58 that runs in the glue-box or reservoir 54 across the faces of the pickers 6 as they recede from the advancing bottle and move up toward the label-holder; said distributing roller meeting the pickers when near the bottle and then swinging backward in contact therewith as the pickers swing upward, the roller passing into contact with the glue-box roll and there remaining during its period of inaction. The glue-box roll is rotated by any suitable means, as for instance a chain 55 engaging a sprocket-wheel on the glue-roll shaft, and driven from the main shaft or any convenient running part of the machine.

In connection with the label-supply and affixing mechanism, I preferably provide means for preventing contact of the pickers and label-pack, or packs, upon the label-holder, whenever a bottle is absent from the station upon the carrier at which the next delivery would normally occur; thus preventing the pickers from delivering a label where there is no article to receive it. For this purpose I have shown, in the present instance, a means consisting of a lifter for automatically raising the label-holder out of the range of the pickers. (See Figs. 1, 3, 12 and 13.) Fulcrumed upon the frame at 56 there is a tilting lever 57, one arm of which extends beneath the label-holder frame, while its other end projects beneath a rocking member 58 pivotally supported upon a stationary part and carrying a lug or detent 59 that moves toward and from the arm of the lever synchronously with the action of the pickers. The rocker 58 is connected by a link 60 with a crank arm 61 on the rocking shaft 49 that carries the glue-distributing roller, or with any other convenient part of the machine that will give like movement. The end of the lever 63 forms a guide for a sliding chock 64 that is attached to a rod 65 which extends to, and is pivotally joined to the upper arm of a vertical rocking shaft 66 supported within a suitable bearing or sleeve, and having at its lower part a feeler member, or projecting curved finger 67 that normally, under the influence of a spring, extends into the path of the bottles, but is crowded out of the way by the bottle when the latter is in position, as at line K, and advancing by the movement of the carriers toward the position for receiving the label. A suitably attached spring 68 is provided for moving the parts to an intercepting position, as indicated by dotted lines on Fig. 3, whereby the chock 64 comes between the lug 59 and lever 57, and when so positioned a movement of the rocker then depresses the lever and lifts the label-holder 15 out of reach of the pickers 6 as the latter approach the packs. When a bottle is in position the chock is drawn back by the action of the feeler finger 67 and rod 65, so that the lug 59 comes down to the lever without contacting with the chock, and without affecting the label-holder.

To facilitate the lifting of the label-holder at any time desired, a handle-lever 70 can be pivoted on the frame and arranged to swing against the lifter, substantially as illustrated in Fig. 12. This device can be manually operated by the attendant, and not only serves for lifting the label-holder, but also for locking the parts with the label-holder in raised position. The handle-lever 70 is omitted from Fig. 13 and other figures of the drawings, except Fig. 12, to avoid confusion of lines.

In some instances it is desirable to provide the labeling machine with an automatic appliance for discharging or moving the labeled bottles or articles from the carrier or table 12 to a suitable means for their transfer to the packing room, or such place as may be desired. For this purpose I provide an automatic discharge mechanism, or device, that contacts with the bottle at a predetermined station as the carrier revolves, and forces the bottle B outward beyond the periphery of the table onto a guide 71, or means that directs or conveys it away from the machine. In the present drawing I have shown said discharging device made as a yieldably arranged arm or lever 72 which is mounted on an upright shaft 73 that rocks in bearings fixed to a member dependent from the frame above, said rocking parts being provided with a spring 74 that normally throws the arm or lever 72 outward and across the path of the bottles. The face of this arm or lever is of a peculiar curved form, having a lip or member that acts against the side of the bottle and a surface 76 that contacts with the bottle-supporter or rest 14. The end of the lever is offset, as at 77, so that the return of the lever, after it has been forced back to the position indicated by dotted lines on Fig. 4, by the passing of the bottle-supporter, will return to its normal position without shock, under the action of the recoil spring 74. A portion of the side of the bottle-supporter 14 may be cut away to allow the face lip 75 to act against the bottle without the lever interfering with said bottle-supporter until such time as it is ready to be forced back out of the path of the bottles, to permit the supporter to pass. This discharging device is quite simple and may be combined with the carrier in such relation as to discharge the bottle therefrom at any convenient predetermined part of the cycle after the bottles have passed the wipers. As the machine is adapted for intermittent stopping at the several stations, as well as for continual running of the carrier, the discharge device is preferably located to effect the discharge of the bottles at or near the fourth station, while the feeding of the bottles into the machine is effected between the fifth and first stations, or at about the position indicated by the line F.

In the operation, the bottle B, or article to be labeled, is placed or deposited upon the carrier-table 12, in upright relation at the front of the bottle-supporting member 14. The machine being started, by the depression of the treadle T which permits engagement of the clutch C, the bottle is carried forward by the rotary movement of the carrier imparted by the gears 2, in the direction indicated by the arrow on Figs.

4 and 7. At the same time the pickers 6, having a label or labels adhering thereto, swing down from beneath the label-holder and meet the advancing bottle, bringing the label into conjunction therewith when the pickers are at about the position of line $d$ shown on Fig. 7. Just before the pickers reach that position the gripping devices 21 and 22 are caused to bring their gripping ends between the pickers and behind the labels, then swing inward to press the label against the surface of the bottle. Immediately after the grip-devices have pressed the central part of the labels against the bottle the pickers are caused to retreat or swing away therefrom in the general direction of the carrier movement, but at greater velocity, the difference in movement being such that the label is stripped from the pickers, and the pickers get out of the way of the advancing bottle by moving up to the label-holder; glue, gum or adhesive being meanwhile applied to the picker faces by the roll 47 carried by the arm 48, as above described. As the first bottle passes forward to the wipers a second bottle is placed on the carrier, and so on in successive order. The grip-devices retain their hold upon the labels until the bottle has passed the wipers, then said grip-devices are severally retracted by their controlling cams. In the event of no bottle being in place, the feed-stop devices come into action by reason of the non-movement of the feeler-device 67; the chock 64 remaining between the actuator 58 and lifter-lever when the glue-distributer-roll swings back from the pickers. The lifter 57 is thereby operated to prevent contact of the pickers 6 with the labels carried by the label-holder, as hereinbefore described.

It will be observed that the pickers having the label, or labels, temporarily adhering thereto by their coating of fresh glue, bring the labels to meet the bottle or article to be labeled while the latter is moving forward at the normal speed of the carrier, and that as soon as the label is caught by the gripping device a reverse movement of the pickers occurs; the pickers and bottle being then both moving in approximately the same general direction, but with the pickers moving at greater speed, while the differential of the respective movements widens the distance between the bottle and pickers. It will be noticed that the labels are stripped off or peeled from the glue-applying faces of the pickers by the effect of this differential movement at a moderately slow and easy rate of detachment and not at the same high velocity at which the pickers themselves are moving; the actual celerity of the stripping action being the differential of the two movements, or the velocity of the picker movement minus the velocity at which the bottle is moving, thus affording ample time for the strain on the label to overcome the cohesive resistance due to the viscosity of the adhesive. Hence it will be seen that a labeling machine involving this action can be operated at comparatively very high speed without liability of tearing apart the labels by the suddenness of their draft from the glue-coated picker faces. This is a feature of importance, since it renders possible high speed labeling. Heretofore labeling machines have been conditioned as to speed by the necessary time allowance for detaching the labels from the gummed pickers without tearing the labels. My invention, in which the bottle actuating means and the label-carrying pickers move together in the same general direction, but at different speeds, during the label stripping operation, provides the necessary time allowance. A differential movement will obviously result whenever either the pickers or the bottle actuating means and bottle move in approximately the same direction at different speeds, during the time of the stripping action without regard to which of the members is moving faster than the other; nor what the speed or relative direction of motion of the parts at other times is. The result is a great increase in speed of operation, since the label-carrying pickers and bottle can be brought into juxtaposition, moving the parts at high speed and preferably in opposite directions, as shown in the drawings; the motions of the parts being added together on the approach and the motion of the bottle subtracted from the picker motion during the stripping operation, leaving a slight relative motion or differential during the label stripping operation while the bottle and pickers are both moving in the same general direction.

The preferred, because the simplest and most effective, means for getting the desired differential motion between label-carrying pickers and the bottle is to give to the label-carrying pickers and their carriers a motion in both directions somewhat in excess of that of the bottle and its actuator. In this way the parts are brought into juxtaposition rapidly and when separated by the reversal of the direction of the pickers and picker-carrier the differential speed is instantly established without the use of any special mechanism.

While the structural embodiments of my invention as herein disclosed are what I, at the present time, consider preferable ones, I am aware that in practising my invention various modifications and mechanical changes may be resorted to, by persons skilled in the art, without departure from the essential spirit and scope of the invention as expressed in the claims. Therefore, I do not wish to be limited to the precise form of construction in proportions and details, as herein shown, but

What I claim as of my invention and desire to secure by Letters Patent is—

1. In a labeling machine, the combination of a horizontally rotatable table or carrier, and means for imparting motion thereto, a series of upright supporting rests mounted on said carrier that move in a circular path, an overhead bottom-delivery label-holder, glue-applying pickers that move to and fro for taking labels from the label-holder and presenting the same in front of the bottle supported by one of said rests, a moving grip-device, means for advancing and actuating said grip-device, and means for wiping the labels upon the bottle as the table or carrier advances.

2. In a labeling machine, in combination, a rotary table carrier, upwardly projecting members carried thereon for supporting a bottle or article to be labeled in approximately upright position to receive the label upon its advance surface, a picker-carrier fulcrumed upon an axis stud disposed above the height of the bottle and over one side of the bottle-carrier for swinging the pickers in a plane approximately tangential to the circular path of the bottle-supporting means, and for presenting the label to the advancing bottle, a bottom-delivering label-supply holder above and in line with said glue-applying pickers, means for operating said pickers, means for supplying paste to the pickers, and means for operating said rotary carrier.

3. In a labeling machine of the class described, a rotating rest-carrier table, movable about an upright axis member, a plurality of upright supporting rests mounted on said table, an actuating gear fixed to said rest-carrier, a swinging picker-carrier fulcrumed on a horizontal axis above the side of said table; glue-applying pickers attached to said picker-carrier adapted to swing in a plane tangential to the circular path of the supporting-rests, a horizontal overhead operating shaft having a pinion thereon that meshes with said table-actuating gear, and a cam that actuates said picker-carrier, a label-holder in alinement with said pickers, a glue-box, and a glue-distributing roller moving in central alinement with the pickers, and having a rocking axle with cam-engaging arm, a cam mounted on the operating-shaft that actuates said rocking axle, and means for rotating said operating shaft.

4. In a machine of the class specified, in combination, a revolving bottle-carrier having means for supporting a bottle thereon to travel in a circular path; a pair of label-delivering pickers that move to meet the advancing bottle for depositing a label against the surface thereof and then retreat from the advancing bottle by a movement approximately in the general direction in which the bottle is moving, means for imparting movement to said pickers, and means for rotating said bottle carrier.

5. In a machine of the class specified, in combination, a horizontally rotatable bottle-carrier, means thereon for the support of a bottle to be carried in a circular path, a set of label-gumming and delivering devices that bring the labels in front of the advancing bottle and then retreat in the general direction of the bottle movement, means traveling with said carrier for gripping the labels to the bottle surface as the movement of said delivering means is reversed, a label-holder, gum-supplying means, means for rotating said bottle-carrier, and means for controlling the label-gumming and delivering devices.

6. In a machine of the class specified, in combination, a revolving carrier, means for imparting rotative movement thereto, a plurality of supporting members near the periphery of said carrier, said supporting members being adapted for carrying bottles or the like in a circular path, an overhead-pivoted picker-carrier provided with glue-applying pickers adapted to swing toward and away from the advancing bottle at a predetermined position, and in a plane approximately tangential to the circular path of the bottle-supporting member, a bottom-delivery label-holder in alinement with said pickers, means for supplying glue to the picker faces, and an operating-shaft having means for actuating said picker-carrier and the glue-supplying means.

7. The combination, with mechanism for delivering labels, means for affixing labels, a revoluble bottle-carrier, means for rotating the same, and an upright bottle-supporting rest mounted on said carrier, of an oscillating label-gripping device that primarily retains the label while releasing it from the delivery mechanism, said gripping device being pivotally mounted on said carrier below the bottle, its gripping end movable toward and from said rest in a plane approximately central with the path of the bottles, and means for actuating said gripping device at the predetermined location in the cycle of the carrier movement, at which the label is delivered for affixment.

8. In a labeling machine the combination, with a movable carrier provided with means for advancing it, a perpendicular supporter upon said carrier for supporting a bottle or the like thereon, and mechanism for gluing and presenting labels to a bottle supported on said carrier; of two independently actuated label-gripping devices mounted respectively at the base and top of the bottle supporter to travel in connection with said carrier and respectively adapted for contact with the body-labels and neck-labels, and independent controlling means for severally operating said gripping devices.

9. The combination, with a label-supply means, label-affixing wipers, and glue-distributing appliances; a rotary bottle-carrier, a center shaft therefor, means for rotating said bottle-carrier, a plurality of upright bottle-supporting-rests mounted upon said carrier, a rocking picker-carrier carrying a pair of glue-applying pickers that move from the label-supply to the circular path of the bottles for presenting labels to the moving bottles at a predetermined position in the bottle-carrier circuit, a plurality of label-gripping devices comprising an upper gripping member and a lower gripping member that travel with said rotary carrier, and are also movable toward and from the respective supporting rests, and engage the labels adhering to said pickers for stripping the same therefrom at the predetermined position and retaining a centering hold thereon until the bottle has passed through the label-affixing wipers, and means located beneath the bottle-carrier for actuating said gripping devices.

10. In a labeling machine, in combination with mechanism for feeding and affixing neck labels, a rotary table or carrier having means for supporting a bottle or the like in upright relation thereon; a neck-label grip-device pivotally connected to said supporting means to swing down against the neck of the bottle and up to a position above the path of the delivered labels, and means for actuating said grip-device in a plane approximately in alinement with the neck of the bottle and path of the bottle movement.

11. In a labeling machine, in combination, with mechanism for gluing, feeding and wiping on the labels, a rotary carrier, an upright bottle supporter carried thereon, a label-gripping device mounted upon said bottle supporter standard and pivoted to move into and from contact with a label delivered adjacent to the neck of the bottle, and means for operating said gripping device, for the purpose set forth.

12. In a bottle-labeling machine, the combination with means for feeding and affixing labels, a movable bottle-carrier, a bottle-supporter comprising an upright hollow standard fixed upon said carrier, and having a rest or seat for the bottle secured thereto, a neck-label grip-device pivoted to the top of said standard to swing down in line with the neck of the bottle, a connecting-rod joined to said grip-device and extending through said standard, and means located beneath the carrier and in connection with said rod, for operating and controlling the grip-device action.

13. In a machine of the character described, in combination with means for delivering labels, glue-applying devices, and dual affixing wipers, a bottle-carrier, and means thereon for sustaining a bottle or the like in position for receiving a body-label and a neck-label; of dual grip means comprising an upwardly acting grip-lever fulcrumed adjacent to the foot of the bottle, and a downwardly acting grip-lever fulcrumed adjacent to the head of the bottle, each adapted to swing in a plane approximately in alinement with the central axis of the bottle, and means for actuating the respective grip levers at a predetermined position of the carrier.

14. In a labeling machine, and in combination, a horizontally rotating carrier having thereon a plurality of supporters for sustaining bottles or the like in approximately upright relation while moving the same in a circular path, means for gumming and delivering labels adapted to move in a plane approximately tangential to the path of the bottles carried by said supporters, and to meet the advancing bottle at a predetermined position, a plurality of label-gripping devices mounted upon the carrier and respectively adapted for holding the label centrally against the body of the bottle as the gumming and delivering means is retracted, and means over which the carrier passes, whereby said grip-devices are actuated at predetermined positions in the circuit of the carrier action.

15. In a machine of the class described, in combination, a rotatable carrier or table, means for supporting bottles or the like thereon in approximately upright position and advancing the same in a circular path, a bifurcated picker-carrier having a horizontal pivotal axis above the path of the bottles, glue-applying pickers attached to said picker-carrier and adapted for presenting a label in front of the bottle by a swinging action, a label-supply holder coöperating with said pickers, a label-gripping device pivotally mounted upon the rotatable carrier and arranged to swing upward between the pickers, and clamp the delivered label against the bottle, and to swing downward to a position below the bottom edge of the label, means operating said picker-carrier, and means under the rotatable carrier for actuating said grip-device.

16. In a machine of the character described, in combination, a rotary bottle-actuating carrier having means for supporting bottles, or like articles to be labeled, in approximately upright position thereon, wipers between which the bottles are passed by movement of said carrier, a label-supply holder located out of line with respect to the path of the bottles, a picker-carrier provided with a pair of projecting pickers adapted to move from said label-supply to coact with a bottle standing upon and moving with the bottle-actuating carrier, for delivering the label adjacent thereto, a gripping-device arranged to travel with said bottle-actuating carrier and also to bring its gripping end between the pickers and grip the label carried thereon to the bottle, on a line approximately coincident with its central axis, and for stripping the label from the pickers while the bottle and gripping member are constantly moving forward, and means for actuating, retaining and retracting the gripping-devices.

17. In a machine of the class described, in combination with means for gluing and delivering labels, and means for wiping on or affixing said labels; a revolving table, bottle-supporting devices each consisting of a standard fixed upon said table and having a bottle-guiding device mounted thereon; of upper and lower label-gripping devices acting above said table, operating levers therefor carried beneath said table and connected for working the grip-devices, suitable springs for applying the grip pressure, and a controlling cam concentric with the table-supporting standard, and adapted for controlling the gripping action.

18. In a bottle labeling machine, in combination, a standard frame provided with an upright pintle-shaft and an upwardly extended arm that supports the top frame, a rotary table mounted thereon and provided near its periphery with a series of means for supporting bottles or the like, means for rotating said table fo radvancing the bottles in successive order, means for gumming and presenting labels thereto acting in a direction approximately tangential to the path of the bottles, label-gripping devices that travel with said table, and stationarily supported wipers located at a position out of alinement with the label-delivering means, but arranged at either side of the path in which the bottle advances, and adapted for wiping the labels by the moving bottles, passing between said wipers.

19. In a labeling machine for bottles or the like, in combination with a rotary carrier having means for supporting bottles in approximately upright relation thereon, a means for gluing, delivering and gripping a label to a bottle supported on said carrier; of a wiper mechanism comprising gangs of yieldably supported wiping fingers, right and left rocking shafts having said gangs of wiping fingers mounted thereon, connections for imparting rocking movement to said shafts for causing said gangs of wiper fingers to move toward and from each other, and operating means including cams for controlling the movement, for the purpose set forth.

20. In a labeling machine of the class described, the combination of a traveling bottle-supporting carrier adapted for carrying forward a bottle or the like to receive its label, means for operating said bottle-supporting carrier, pickers that move into position to meet the advancing bottle and deliver a label across the face thereof, and then retreat at a speed greater than the speed of the carrier movement, means for operating said pickers, gripping means mounted upon and traveling with said bottle-supporting carrier, said gripping means adapted to pass between the pickers for clamping the delivered label against the bottle; means for actuating said gripping-devices, a pair of stationed wipers between which the bottle and label-gripping means pass, and means for supplying glue to said pickers during their retractive movement.

21. In a machine of the class described, the standard frame provided with an upright central shaft or pintle, a rotary carrier mounted on said pintle as an axis, bottle-supporting means arranged at intervals upon said carrier, a gear-wheel attached to the top members of said carrier, a supplemental frame providing an overhead support, the operating shaft mounted in bearings thereon, said shaft having a pinion that meshes with the carrier gear, a top-charged bottom delivery label-holder, and a swinging picker-carrier supported on said top frame, pickers attached to said picker-carrier, a picker-actuating cam mounted on said operating shaft, a glue-supply reservoir, and the glue-distributing roller carried by an arm attached to an overhead rocker shaft, an actuator arm on said shaft, a cam upon the operating shaft, and a suitable spring acting in opposition to said cam for controlling said distributing roll.

22. In a machine of the class described, in combination with a carrier provided with means for carrying a series of bottles to be labeled, a label-supply holder, a movable picker-carrier and pickers that take the label from said label-holder and present it for affixment to a bottle in said series; of an automatic stop-device, and means actuated thereby for preventing contact of the pickers with the label supply when a bottle is absent from the carrier means.

23. In a machine of the class described, in combination with a movable carrier provided with means for carrying a series of bottles to be labeled, a label-supply holder, a movable picker-carrier with pickers that take the label from said label-holder and present it for affixment to a bottle in said series; an automatic label-feed controlling means arranged for elevating the label-holder out of the reach of the pickers when a bottle is absent from the serial position in said bottle-carrier.

24. In a labeling machine, the combination with a rotatably moving carrier provided with standing bottle-supporting means at a plurality of successive positions thereon, a label-supply holder, and glue-applying pickers adapted for taking labels from said holder and presenting the same for affixment to the bottle at a predetermined position in the circuit of the carrier; of an automatic feed-controlling means including a label-holder-lifting device, a working element turned synchronously with the picker action, a movable spring-actuated member interposed between said working element and label-holder-lifting device, to render said latter device operative through said interposed member for preventing the delivery of labels from the label-holder to the pickers when no bottle or the like is in place to receive the label, means for retracting said member from interposed relation when a bottle or the like is normally approaching the position for receiving its label, and a bottle-actuated device that controls the action of said means.

25. In a machine for labeling bottles or the like, the combination with a moving carrier provided with means for supporting a plurality of successively placed bottles thereon, and advancing the same to predetermined stations for receiving a label and for wiping on the label, a label-supply holder, and movable pickers that take the labels from said holder and deliver them for affixment to the bottles while successively moving in the course of said carrier; of an automatic shifter mechanism that moves the label-supply holder out of reach of the pickers, and means for controlling said shifter mechanism to act when no bottle or the like approaches the predetermined station for receiving the label.

26. In a machine for labeling bottles or the like, the combination, of a label-holder-support having guides or pins, the label-holder supported to move thereon, a lifting-lever fulcrumed upon the frame and one of its arms engaging with said label-holder for lifting the same, an actuating means for the other arm of said lever moving synchronously with the labeling-stroke of the machine, a shiftable chock or engaging member intermediate said lever and its actuating means, a spring that normally draws said chock to engaging position, a controlling feeler intercepting the path of the bottles upon the carrier, but retractable by the bottle, and a connection from said feeler to said engagement-member that shifts the latter from engaging to idle position and thereby prevents movement of said lifting-lever when said feeler is pressed back out of the path by the bottle, substantially as set forth.

27. In a machine for labeling bottles or the like, the combination, of a rotatively moving carrier provided with standing bottle-supporting means at a plurality of successive positions thereon, a label-supply holder, and glue-applying pickers moving in a plane approximately tangential to the path of the bottles and adapted for taking labels from said label-supply holder and presenting them to the bottle at a predetermined station in the circuit of the carrier movement; glue-distributing means for charging adhesive onto the picker faces, a label-gripping means, and pairs of stationed wipers between which the bottle is passed by its carrier movement, the wipers for neck-labels being mounted to swing laterally, and having actuating connections automatically controlling the lateral motion thereof in unison with the carrier movement.

28. In a labeling machine, in combination with a rotatable bottle-carrier having thereon upright bottle-supporters that travel in a circular path, a label-supply, and wiper means for affixing labels to bottles or the like moving in said path; of glue-applying pickers having a backward and forward movement for delivering labels to the bottle supported upon said carrier, said pickers moving to and from the bottle in a plane approximately tangential to the circular path of the bottles and the rotatable carrier.

29. In a labeling machine, in combination, means for supporting and carrying forward a bottle or the like, a pair of glue-applying pickers movable toward and from the advancing bottle for presenting labels adjacent thereto, label-gripping devices for pressing the labels against the bottle between said pickers, means for imparting to said pickers a retractive movement differential in relation to the movement of the bottle, whereby stripping of the glued label from the glue-applying faces of the pickers is effected while the bottle and pickers are moving in the same general direction.

30. In a labeling-machine, in combination, a traveling bottle-supporting carrier, glue-applying pickers that move to and from the same for delivering a label to a bottle or the like supported thereon, means for clamping the label to the surface of the bottle, and means for operating said parts to effect transfer of the label from the pickers to the moving bottle by a differential movement of the bottle-supporting carrier and pickers in relation to each other, when moving in approximately the same general direction.

31. In a labeling-machine, a carrier having a horizontal circular movement, a plurality of devices thereon for supporting bottles or the like to be labeled, label-gripping devices mounted to travel therewith, a label-supply holder, means for gluing and delivering labels from said holder to a bottle or the like upon said moving carrier, mechanism for imparting to said label-delivering means a reciprocative action for approaching the advancing bottle and then retreating therefrom by a movement differential to the movement of the carrier and gripping devices, while transferring the labels thereto, means for wiping the labels, and means for actuating said gripping devices.

32. In a labeling machine, in combination, a moving bottle-actuating means; a label supply; pickers for taking a label and moving from the label supply to deliver the label to a bottle carried by the bottle-actuating means, and means for affixing the label upon the bottle; the pickers and bottle actuating means being arranged for traveling in the same general direction but at different speeds, while the label is being stripped from the pickers.

33. In a labeling machine, in combination, a moving bottle-actuating means, a label-supply, pickers for taking a label and moving from the label-supply to meet a bottle on the moving bottle-actuating means and delivering the label thereto, and then back away from the bottle at a greater velocity than the movement of the bottle, a label-grip-device to hold the label on the bottle and strip the label from the pickers, while the pickers back away.

34. In a labeling machine, in combination, a moving bottle-actuating means; a label-supply, a moving picker carrier with pickers for taking a label and moving from the label-supply to meet, and deliver the label to, a bottle on the bottle-actuating means and then back away therefrom at a greater velocity than the movement of the bottle-actuating means, a label-grip device to hold the label upon the bottle and strip it from the pickers while the pickers back away therefrom, and wipers for wiping the label onto the bottle.

35. In a labeling machine, in combination, means for supporting and carrying forward a bottle or the like, a label-supply, a carrier provided with a pair of glue-applying pickers movable from the label-supply into the path of the bottle to deliver a label thereto, said pickers traveling in the same general direction as the bottle, but at greater speed during the delivery of the label from the pickers to the bottle.

36. In a labeling machine, a discharging means comprising a swinging arm having a bottle-pushing surface and a guiding contact surface, an axis support for said arm, and a spring for imparting actuating pressure on said arm for displacing the bottle; in combination with a rotary carrier, an upright bottle-supporting rest mounted upon said carrier and having a lateral recess for accommodating said bottle-pushing surface without contact, and means for rotating said carrier to bring said bottle-supporting rest past said discharging means.

37. In a labeling-machine, a bottle-discharging means comprising a pivoted element having a bottle-pushing surface and a guiding contact surface terminating with an offset retreating end, an axis-support for said element, and a spring connected for moving said element on its axis; in combination with a rotating carrier, a series of bottle-supporting rests mounted upon said carrier, and means for engaging said guiding-contact surface for controlling the action of the discharging member in opposition to the force of said spring.

38. In a machine for labeling bottles or the like, in combination, a bottle-carrier adapted for actuating bottles standing thereon in upright relation, dual label gripping means carried thereon and provided with grip-fingers for respectively holding a body-label and a neck-label by separate contact faces, and a bottle-rest adapted for contact with the opposite side of the bottle at an intermediate position in relation with the contact faces of said grip-device, for the purpose set forth.

39. In a labeling machine of the character described, the standard frame having an upright shaft supported therein, a rotatable bottle-carrier having an upward central extension mounted on said shaft and provided with a drive-gear fixed upon its upper end, said gear being formed with its body portion depressed or dish-shaped, an operating shaft provided with a pinion that drives said gear and carrier, and the top bearing frame including an overhanging arm that turns downward over the rim of said gear and forms a support for the top-end of said upright shaft and a journal bearing for the operating-shaft, within the circle of the toothed face of said gear.

40. In a labeling machine, in combination, a bottle-supporting means having rotary movement about a central axis, an overhanging label-holder, swinging pickers pivotally suspended upon an axis-stud located above the bottle-supporter in approximately radial relation to said central axis, said pickers being arranged to deliver labels to a moving bottle and to then back away therefrom at greater velocity than the movement of the bottle-supporting means, actuating-gearing for the bottle-supporting means, and an operating-shaft having thereon means that engages with said gearing, and means for imparting motion to said pickers.

41. In a labeling machine of the class described, the combination with the rotating carrier or table movable about an axis, a plurality of upright bottle-supporting devices mounted on said table, and means for gluing, presenting, and affixing labels to bottles or the like carried thereon; of an automatic bottle-discharging means comprising a spring-pressed arm or lever having an approximately upright axis and adapted for normally swinging outward across the path of the bottles, and a spring connected with said lever and affording a tension for forcing the bottle from position, but yielding to the passage of the bottle-supporting means.

42. In a labeling machine, the combination, of a horizontally movable carrier, means for imparting motion thereto, a series of upright supporting rests moving with said carrier, an overhead bottom-delivery label-holder, glue-applying pickers for taking labels from said label-holder and presenting the same in front of a bottle supported upon said carrier, a grip-device traveling with the carrier, means for wiping the labels upon the bottle as the carrier advances, and means for displacing the bottle laterally from its path as the carrier moves past a predetermined position.

43. In a labeling machine in combination, means for supporting and carrying forward a bottle or the like, a label-supply means, glue-applying pickers movable from the label-supply to the forwardly moving bottle to deliver a label thereto, means for temporarily holding the label against the moving bottle, said pickers having a receding movement approximately in the same general direction as the bottle is moving, but at different speed, to release the label from the glued surface of the pickers and transfer it to the bottle by the differential speed, and means for subsequently smoothing the label upon the bottle as it moves forward.

44. In a labeling machine, in combination, means for supporting and carrying forward a bottle or the like, a label supply, a pair of glue applying pickers movable from the label supply into the path of the bottle to deliver a label thereto, said pickers traveling while the label is being stripped therefrom in the same general direction as the bottle, but at different speed, to transfer the label from the pickers to the bottle by the differential speed.

Witness my hand this 16th day of September, 1912.

FRANK O. WOODLAND.

In presence of—
   CHAS. H. BURLEIGH,
   FREDERICK W. WHITE.